March 27, 1928.
H. ROSSOW
1,663,776
SELF REVERSING SLICING MACHINE
Filed March 19, 1927
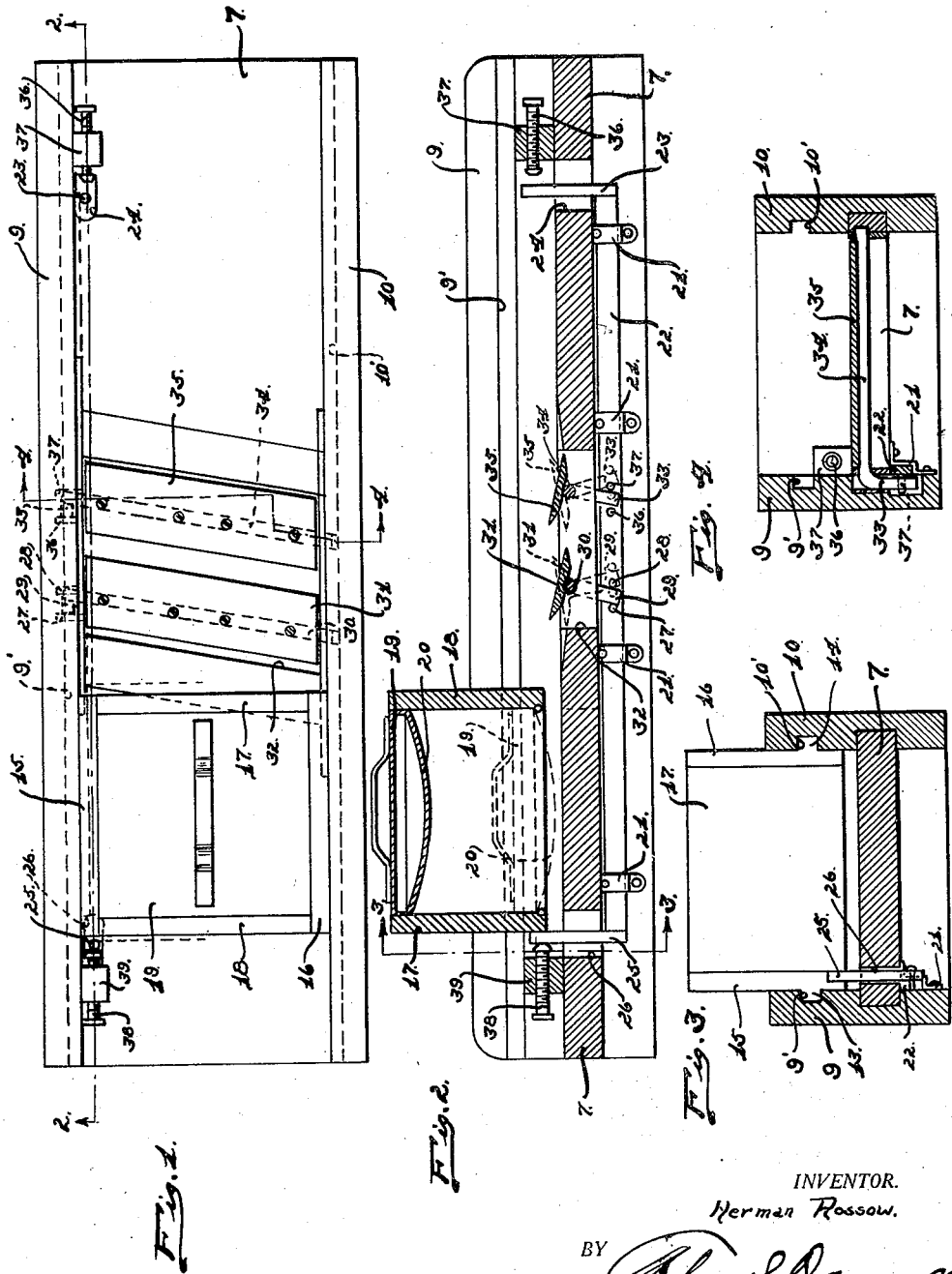
INVENTOR.
Herman Rossow.
BY
ATTORNEY.

Patented Mar. 27, 1928.

1,663,776

UNITED STATES PATENT OFFICE.

HERMAN ROSSOW, OF MELVINDALE, MICHIGAN.

SELF-REVERSING SLICING MACHINE.

Application filed March 19, 1927. Serial No. 176,628.

My invention relates to a new and useful improvement in a self reversing slicing machine, adapted for slicing articles such as vegetables, fruits, and the like, and has, for its object the provision of a machine of this class in which the material to be sliced may be reciprocated over the machine and brought into contact with cutting blades when travelling in either direction, so that a maximum efficiency of the machine is effected, in that the cutting is done in both directions.

Another object is the provision of a mechanism whereby the cutting blades are automatically reversed upon the travel of the material to either side so that the blade is adapted for cutting the material travelling in one direction dependent upon the direction of travel of the material.

Another object of the invention is the provision of an adjusting mechanism whereby the size of the cut may be regulated.

Other objects will appear hereinafter.

The invention consists in the combination and arrangement of parts hereinafter described and claimed.

The invention will be best understood by a reference to the accompanying drawings which form a part of this specification and in which, Fig. 1 is a top plan view of the invention.

Fig. 2 is a sectional view of the invention taken on substantially line 2—2 of Fig. 1.

Fig. 3 is a sectional view taken on substantially line 3—3 of Fig. 2.

Fig. 4 is a sectional view taken on substantially line 4—4 of Fig. 1.

The invention comprises a bed 7 having side walls 9 and 10 which project above and below the bed 7, the downwardly projecting portion serving as a support for the bed 7 and the upwardly projecting sides 9 and 10 being each provided with longitudinally extending grooves 9' and 10' respectively, in which engage ribs 13 and 14 respectively which project out from the side walls 15 and 16 respectively of a material container having the end walls 17 and 18. A suitable cover 19 is provided for the container, this cover also serving as a follower for the material so as to press it firmly against the bed 7. A convex bottom 20 is formed on the cover so that the follower will ride over the cutting elements when travelling in either direction. Secured to the bed 7 and the downwardly projecting portions of the side walls 9 and 10 are guide brackets 21 which slidably support a bar 22, projecting upwardly from which at one end is an arm 23 extending through a slot 24 formed in the bed 7. A similar arm 25 projects upwardly from the opposite end of the bar 22 and extends through a slot 26 formed in the bed 7. These arms are extended so as to project above the upper surface of the bed 7, and engage the walls 17 and 18 upon movement of the material container, which may be termed a carriage, to either side of the bed 7. When moved as shown in Fig. 2 to one side the arm 25 is engaged and the bar 22 moved to the position shown. This bar is provided with the studs 27 and 28 which engage the downwardly projected arm 29 which is fixedly mounted on the shaft 30 upon which is fixedly mounted the blade 31 which is positioned in the opening 32 formed in the bed 7. A similar arm 33 is fixedly mounted upon the shaft 34 upon which is fixedly mounted the blade 35, this arm 33 being adapted to engage the studs 36 and 37 which project outwardly from the bar 22. When moved into the position shown in Fig. 2 the blades are rocked so as to raise one of the edges above the upper surface of the bed 7. Both edges of these blades are sharpened and when the carriage is moved to the opposite end so as to move the arm 23 into engagement with the adjusting screw 36 the blades will be rocked into the position shown in dotted lines in Fig. 2. The adjusting screw 36 is threaded in the projection 37 which extends upwardly from the bed 7. A similar screw 38 is threaded in the projection 39 extending upwardly from the bed 7, these adjusting screws determining the throw or amount of movement of the bar 22. When the material is placed in the carriage or container and slid over the knives 31 and 35 each of the knives will effect a slicing of the material, the slices cut therefrom falling into the opening 32. When the bar 22 is engaged and brought into the contact with the screw 36, the knives will be tilted into position shown in dotted lines in Fig. 2 for engaging the material and slicing the same, upon reverse movement of the carriage.

In this way I have provided a device whereby the blades automatically reverse themselves for slicing the material depending upon the direction of travel of the material. I have also provided an adjustment means for regulating the tilt of the knives and thus adjusting the thickness of the slices or depth of the cut.

It is believed that the simplicity and durability of the structure will be recognized from the description given and that it is one which may be economically manufactured and quickly assembled.

While I have illustrated and described the preferred form of my invention I do not wish to limit myself to the precise details of structure shown, but desire to avail myself of such variations and modifications as come within the scope of the appended claims.

Having thus described my invention what I claim as new and desire to secure by Letters Patent is:

1. A cutting machine of the class described comprising: a bed; a cutting element projecting transversely of said bed and rockingly mounted, said cutting element, upon rocking in either direction, a predetermined distance, projecting one or the other of its edges above the surface of said bed; an arm projecting downwardly from said cutting element; an engagement member at opposite ends of said bed; means for connecting said engagement members; and means on said connecting means for engaging said arm and rocking said cutting element on its mountings upon movement of either of said engagement members in either direction.

2. A cutting machine of the class described comprising: a bed; a cutting element rockingly mounted on said bed in an opening formed therein and adapted upon rocking in either direction for extending one of its edges above the surface of said bed; an engagement member at each side of said bed projecting through a slot formed therein; a bar positioned below said bed and connecting said engagement members, said engagement members and said bar being longitudinally slidable relatively to said bed; an arm projecting downwardly from said cutting element; and means on said bar for engaging said arm upon slidable movement of said bar in either direction for locking said cutting element to project its edges above the surface of said bed.

3. A cutting machine of the class described comprising: a bed; a cutting element rockingly mounted on said bed in an opening formed therein and adapted upon rocking in either direction for extending one of its edges above the surface of said bed; an engagement member at each side of said bed projecting through a slot formed therein; a bar positioned below said bed and connecting said engagement members, said engagement members and said bar being longitudinally slidable relatively to said bed; an arm projecting downwardly from said cutting element; and means on said bar for engaging said arm upon slidable movement of said bar in either direction for locking said cutting element to project its edges above the surface of said bed, said engagement members connected by said bar being in the position of travel of an article sliced when slid over said bed.

4. A cutting machine of the class described, comprising: a bed; a cutting element rockably mounted in an opening formed in said bed; an engagement member at each end of said bed projecting through a slot formed in said bed; means below said bed for connecting said engagement members, said engagement members being slidable in unison longitudinally of said bed and in the path of travel of an article slid over said bed, the engagement of said article with said engagement members effecting a longitudinal movement of said bar; and means on said bar for, upon longitudinal movement of the same, rocking said cutting element to bring its opposite edges above the upper surface of said bed.

5. A cutting machine of the class described, comprising: a bed; a cutting element rockably mounted in an opening formed in said bed; an engagement member at each end of said bed projecting through a slot formed in said bed; means below said bed for connecting said engagement members, said engagement members being slidable in unison longitudinally of said bed and in the path of travel of an article slid over said bed, the engagement of said article with said engagement members effecting a longitudinal movement of said bar; means on said bar for, upon longitudinal movement of the same, rocking said cutting element to bring its opposite edges above the upper surface of said bed, the degree of movement of said bar determining the pitch of said cutting element relatively to said bed; and means for adjusting the amount of movement of said bar relatively to said bed.

In testimony whereof I have signed the foregoing specification.

HERMAN ROSSOW.